United States Patent [19]
Gavin et al.

[11] Patent Number: 5,836,360
[45] Date of Patent: Nov. 17, 1998

[54] VOLUME CONTROLLED RECEPTACLE

[75] Inventors: Michael Gavin, Warren, N.J.; James A. Mawhirt, Brooklyn, N.Y.

[73] Assignee: International Technidyne Corporation, Edison, N.J.

[21] Appl. No.: 823,973

[22] Filed: Mar. 25, 1997

[51] Int. Cl.⁶ .................................. B65B 1/04; B65B 3/04
[52] U.S. Cl. .................................. 141/126; 141/2; 141/18; 141/311 A; 422/100
[58] Field of Search .................................. 141/126, 2, 18, 141/31, 311 A, 324, 325, 339, 130; 222/108, 572; 422/100; 436/180; D27/212

[56] References Cited

U.S. PATENT DOCUMENTS

| | | | |
|---|---|---|---|
| 2,737,417 | 3/1956 | Gundersen | D27/212 |
| 2,850,050 | 9/1958 | Connolly | 141/126 |
| 3,895,661 | 7/1975 | Praglin et al. | 141/325 |
| 4,706,720 | 11/1987 | Pattison et al. | 141/339 |
| 5,110,555 | 5/1992 | Moore et al. | 141/31 |
| 5,504,011 | 4/1996 | Gavin et al. | |
| 5,534,226 | 7/1996 | Gavin et al. | |

*Primary Examiner*—Steven O. Douglas
*Attorney, Agent, or Firm*—Plevy & Associates

[57] ABSTRACT

A volume-control receptacle has a reservoir with a bottom. The reservoir is adapted for receiving a fluid. The receptacle has a plurality of capillaries opening on the reservoir at a specific height above the bottom; the capillaries draw off the excess fluid from the receptacle, thereby leaving a specific amount of fluid in the reservoir. In a preferred embodiment, the volume-control receptacle is adapted for use with a disposable cuvette. The reservoir of the receptacle has a drain at the bottom connected to the cuvette for delivering the fluid to a testing instrument or other final application point. The volume-control receptacle has a lip projecting upward from a promontory of the receptacle. A rib extends downward from the lip to the bottom of the reservoir for guiding the fluid into the reservoir.

23 Claims, 4 Drawing Sheets

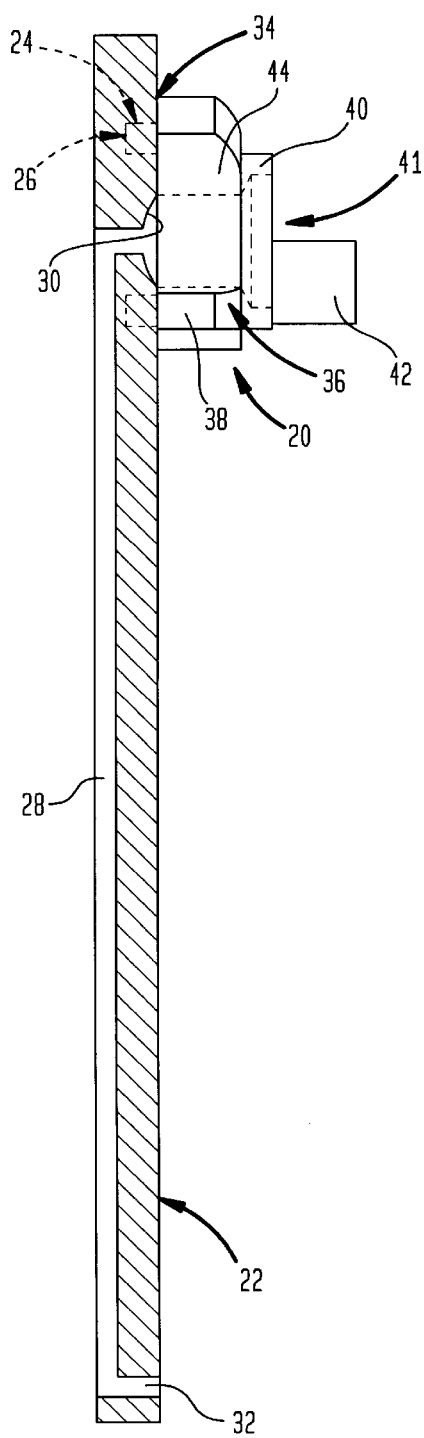
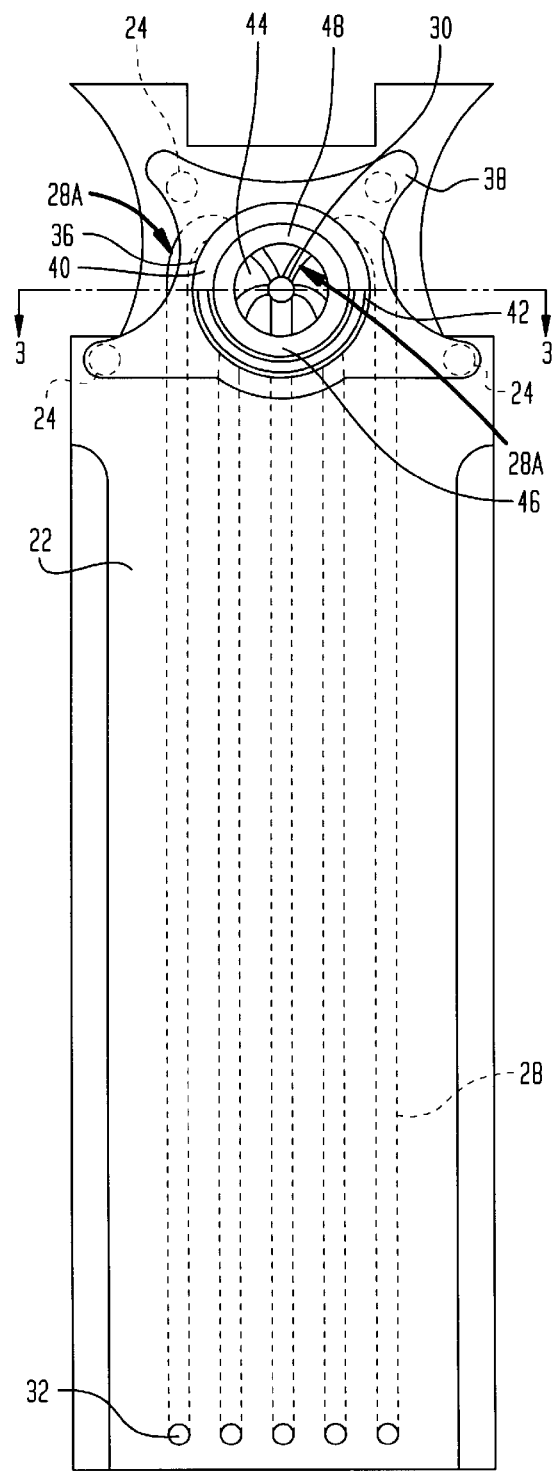
FIG. 1
FIG. 2

VOLUME CONTROLLED RECEPTACLE

FIELD OF THE INVENTION

The invention relates to a receptacle for receiving a specific volume of fluid; more particularly, it relates to a sample cup that will retain and secure a controlled small volume of fluid and will draw away the excess fluid with the use of capillary-type features surrounding the cup perimeter at the fill level and above.

BACKGROUND OF THE INVENTION

There are many applications in which it is necessary or desirable to measure out a specific volume of fluid. For instance, in administering liquid medication to a person, it is desirable to measure out a specific quantity. Medicine droppers, medicine spoons, and medicine cups, all with markings on them, have been used for this purpose. To obtain the proper quantity of liquid, the person administering the medicine places the liquid in the measuring device and attempts to get the meniscus of the liquid to align with the proper marking.

Likewise, in testing fluids (both human fluids such as blood and other fluids), it is desirable and sometimes necessary to use a standardized volume of fluid for the test. It is a recognized practice to use a needle or pipette to measure out the proper volume; the user measures the quantity carefully and slowly delivers the fluid to the test container.

It has been recently recognized that a larger sample of fluid than is required for a test can be placed in a reservoir for certain types of testing apparatus. For example, in some styles of testing apparatus, the fluid can be drawn from a reservoir and then directed to the testing instrument through narrow channels. By using the reservoir and the channels, the testing apparatus can draw the proper amount for the test. For example, reference is made to U.S. Pat. No. 5,534,226 issued to Gavin on Jul. 9, 1996, entitled Portable Test Apparatus and Associated Method of Performing A Blood Coagulation Test, which shows such a test apparatus. While these types of testing instruments have many advantages, the reservoir of fluid needs to be separated from the measured test sample before testing begins; this is typically done by the operator physically removing the reservoir.

Thus, it would be desirable to have a cup or reservoir and method of use which measures out a proper amount of liquid regardless of volume introduced to the reservoir and which neatly and automatically removes any excess.

SUMMARY OF THE INVENTION

The present invention is directed to a volume-control receptacle having a reservoir adapted for receiving a fluid and a plurality of capillaries opening on the reservoir perimeter. An upper opening of the receptacle empties into the reservoir. The capillaries are located at a specific height above the bottom of the reservoir for draining the excess fluid from the receptacle, thereby leaving a specific amount of fluid in the reservoir. The specific volume required, if small, presents various problems which are addressed in this invention by the specific sharp angle, width, size, energy and material of the draw-away capillaries. The intersection of the draw off capillaries to the desired level in the cup wall is critical in the volume draw-off and the specific small volume left behind in the reservoir. The capillaries draw away the excess fluid above the preset level.

Variations in the liquid surface tension, which will vary in different fluids and also in blood to a lesser degree will have a direct effect on the volume of sample left behind. Thus, if there is a 5% variation in surface tension from sample to sample, we can expect less of a variation in sample left behind due to the optimization and efficiency of the capillary to reservoir intersections.

In a preferred embodiment, the volume-control receptacle is adapted for use with a disposable cuvette. Again, the receptacle comprises a reservoir and a plurality of capillaries. The bottom of the reservoir has a drain that opens to a supply area of the cuvette; once the specific volume of fluid is measured by the receptacle, the cuvette delivers the fluid to the testing apparatus (or other final application). In a preferred embodiment, the volume-control receptacle further has a promontory encircling the upper opening of the receptacle and a filling target in the form of a raised lip projecting upward from the promontory. A director rib extends from the top of the lip to the bottom of the reservoir for guiding the fluid down into the reservoir so that the reservoir fills from the bottom up, thereby minimizing the possibility of any bubble entrapment in the reservoir.

In an alternative embodiment, the volume-control receptacle is adapted for use with a bottle and cap. As with other embodiments, the receptacle has a reservoir and a plurality of capillaries for drawing away the excess fluid from the reservoir. In this bottle-cap embodiment, the receptacle is disposed within the bottle cap. The bottle cap has at least one fill port that opens into the bottle container at one end and into an open area above the reservoir at the other end. Fluid is placed in the bottle, and the cap is placed on it. When the bottle is turned upside down, the fluid enters the fill port, and the fill port delivers the fluid from the container of the bottle to the reservoir. When the bottle is then turned right-side up, the fluid flows into the reservoir while the capillaries draw off the excess fluid.

One object, feature, and advantage of this invention resides in the capillaries drawing away the excess fluid to ensure that the sample fluid is of a proper amount. Further objects, features, and advantages of the present invention will become more apparent to those skilled in the art as the nature of the invention is better understood from the accompanying drawings and detailed description.

BRIEF DESCRIPTION OF THE DRAWINGS

To illustrate the invention, there is shown in the drawings a form of the invention which is presently preferred, it being understood, however, that the invention is not limited to the precise arrangements and instrumentalities shown.

FIG. 1 is a side view of a volume-control receptacle carried on a cuvette (shown at the shaded area) according to the invention with the cuvette cut away to show its side view;

FIG. 2 is a top view of the volume-control receptacle disposed on the cuvette;

DETAILED DESCRIPTION OF THE INVENTION

Figure 3:
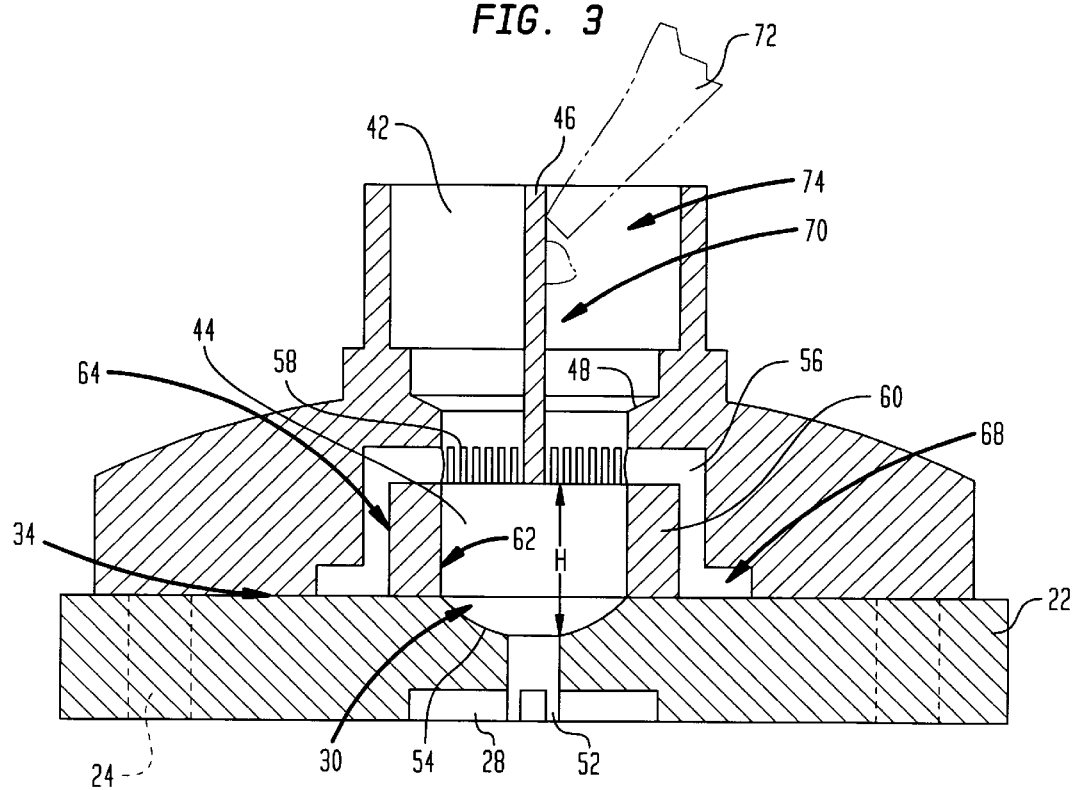
FIG. 3 is a cross-sectional front view of the receptacle and cuvette taken along the line 3—3 of FIG. 2 (with the solid portions of the cuvette shaded with vertical lines and the solid portions of the receptacle shaded with horizontal lines)

Referring to the drawings, wherein like numerals indicate like elements, there is shown in FIG. 1 a side view of a volume-control receptacle, identified generally by the numeral 20. Referring to FIG. 1, the preferred embodiment of the volume-control receptacle 20 is shown. The receptacle 20 is adapted to be carried on a disposable cuvette 22. In this figure, the solid portions of the cuvette are shown shaded with diagonal lines. The receptacle 20 has a plurality of legs 24, which depend from a foundation 34. The cuvette 22 has a plurality of holes 26 for receiving the legs 24 of the receptacle. The cuvette 22 has a plurality of conduits 28 (although only one is shown in FIG. 1). Each one of the conduits 28 extends from a common supply area 30 to a drive aperture 32. The holes 26 of the cuvette may extend through a portion of the width of the cuvette, as shown in FIG. 1, or alternatively, they may extend through the entire width of the cuvette, in which case they need to be disposed outside the path of the conduits as shown in FIG. 2.

The disposable cuvette 22 is used in a testing instrument (not shown), which has a pneumatic source connected to all the drive apertures 32. Although not shown here, the testing instruments are described in detail in U.S. Pat. No. 5,534,226 (previously cited), and U.S. Pat. No. 5,504,011, issued to Gavin on Apr. 2, 1996, entitled Portable Test Apparatus and Associated Method of Performing A Blood Coagulation Test. Both these patents (U.S. Pat. No. 5,534,226 and U.S. Pat. No. 5,504,011), are assigned to International Technidyne Corporation, also the assignee of this application, and they are incorporated herein by reference.

Referring to FIGS. 1 and 2, the volume-control receptacle 20 has a base 36 with a plurality of arms 38, from which the legs 24 depend. A promontory 40 projects upward from the base 36 and encircles an upper opening 41 at the top of the receptacle. A target lip 42 extends upward from a portion of the promontory 40; the lip 42 acts as a target to facilitate filling of the reservoir of the volume-control receptacle, as will be later explained in more detail.

A top view of the volume-control receptacle 20 and disposable cuvette 22 is shown in FIG. 2. Five conduits 28 are shown in hidden line for the majority of the cuvette 22; they extend from underneath the volume-control receptacle 20, where the common supply area 30 is located, to their respective drive apertures 32. (The conduits 28 are shown in solid line near the common supply area 30 and under the reservoir 44 at 28A.)

In FIG. 2, four arms 38 of the volume-control receptacle 20 are shown extending from the base 36. The legs 24, shown in hidden line, each depend from an arm 38. The volume-control receptacle 20 has a reservoir 44 centrally located in the base 36. The promontory 40 encircles the top of the reservoir 44, with the lip 42 projecting upward from the promontory 40. The target lip 42 has a director rib 46 extending downward into the reservoir 44. A ramped surface 48 slopes downward from the lip 42 or the promontory 40 into the reservoir 44. In a preferred embodiment, the target lip 42 is semi-circular.

Referring to FIG. 3, the common supply area 30 for the conduits 28 of the cuvette 22 is seen disposed on the upper surface of the cuvette. In this figure, the solid portions of the cuvette are shown shaded with vertical lines, and the solid portions of the receptacle are shown shaded with horizontal lines. Each of the conduits 28 are in communication with a lower section 52 of the common supply area 30. In this preferred embodiment, the common supply area 30 is located on the cuvette 22, and the reservoir 44 is located in the volume-control receptacle 20; however, when the receptacle is placed on the cuvette, the bottom 54 of the common supply area also defines the bottom of the reservoir 44. A plurality of capillaries 56 are located radially around the reservoir 44 of the receptacle 20. Each of the capillaries 56 has an opening 58 which originates at the reservoir 44 at a specific height "H" above the reservoir bottom 54. The height "H" at which the openings originate defines the height of the fluid in the reservoir and thereby defines (together with the diameter of the reservoir), the volume of fluid that the reservoir will contain.

In a preferred embodiment, the volume-control receptacle has a ring 60 which forms the sidewall 62 for the reservoir 44 and an inner sidewall 64 for each of the capillaries 56. The capillary height is approximately forty-thousandths of an inch (0.040 inches) at a minimum. The capillary width is tapered; the capillaries are narrower at the openings 58 in communication with the reservoir, and they are tapered outward in width as they extend away from the openings 58. The narrower end contacts the fluid initially, and the effectiveness of the capillaries in drawing fluid from the perimeter of the reservoir is enhanced due to this widening capillary feature. In a preferred embodiment, the capillary width is tapered from approximately thirty six thousandths of an inch (0.036 inches) at the openings to forty-six thousandths of an inch (0.046 inches) at their widest portion.

Each of the capillaries 56 extends from the opening 58 at the reservoir 44 to the foundation 34 of the volume-control receptacle 20. The foundation 34 of the receptacle 20 has an annular ring 68 cut around it; the ring 68 communicates with each of the capillaries 56, thereby defining a common terminal or emptying point for the capillaries.

The director rib 46 extends down from the top of the lip 42 and across the ramped surface 48. The rib 46 defines a corner 70 within the target lip 42, against which a pipette tip or needle 72 (shown in phantom), can be placed. The needle 72 contains a fluid 74 (also shown in phantom) to be tested. The fluid 74 flows and is drawn down the corner 70. The corner acts as an accelerator and director for the flow of the liquid.

In operation, the user places the volume-control receptacle 20 on the disposable cuvette 22. The disposable cuvette 22 is installed in the testing instrument (not shown). The testing instrument blocks the drive apertures 32 (shown in FIGS. 1 and 2). The user places a pipette tip or needle 72 (shown in phantom in FIG. 3), next to the director rib 46 that extends up the target lip 42. The user can quickly and without regard to precise volume place more fluid in the volume-control receptacle 20 than is required for the test with the assurance that the volume-control receptacle 20 will remove the excess fluid 74. In particular, the fluid 74 will move down the rib 46 into the reservoir 44. When the fluid 74 fills the reservoir and reaches the level of the capillaries 56, the capillaries will drawn the excess fluid 74 away from the upper fill level of the reservoir 44. The total volume of the plurality of the capillaries 56 is capable of retaining the excess fluid 74 in most situations. When the drive apertures are blocked by the testing apparatus (not shown), the fluid 74 will not enter the lower section 52 of the common supply area 30.

The volume of fluid received in the reservoir will be the volume of fluid defined by the height "h" extending from the reservoir bottom 54 to the capillary openings 58. Once the excess fluid has been drawn away, the user can engage the testing instrument to unblock the drive apertures 32 or create suction on the driver apertures to draw the fluid from the reservoir; the fluid will then travel through the lower section 52 of the supply area 30, through the conduits 28, and into the testing apparatus. Alternatively, the operator can simply push a button on the testing instrument to cause the testing instrument to delay a sufficient time to allow the volume-control receptacle 20 to remove the excess fluid.

In any case, a benefit of the volume-control receptacle 20 is that the testing instrument can automatically operate without the user having to remove a container of excess fluid. Preferably, the volume-control receptacle is made of a molded plastic with the capillaries formed during the molding process. The volume-control receptacle could be formed of other materials, such as metal, and the capillaries could be formed by other processes including machining.

Alternative Embodiments

Figure 4:
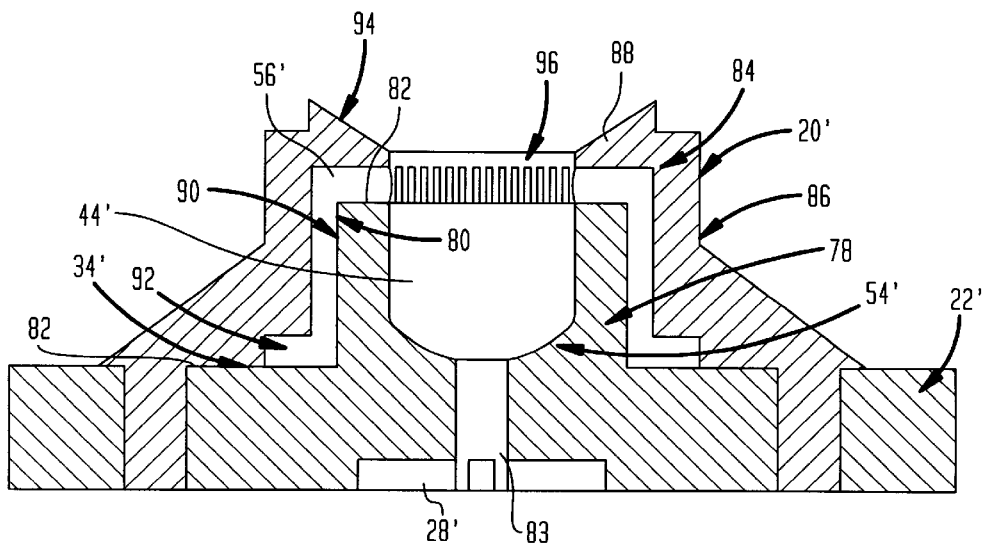
FIG. 4 is a cross-sectional view as in FIG. 3, but showing an alternative embodiment.
Figure 5:
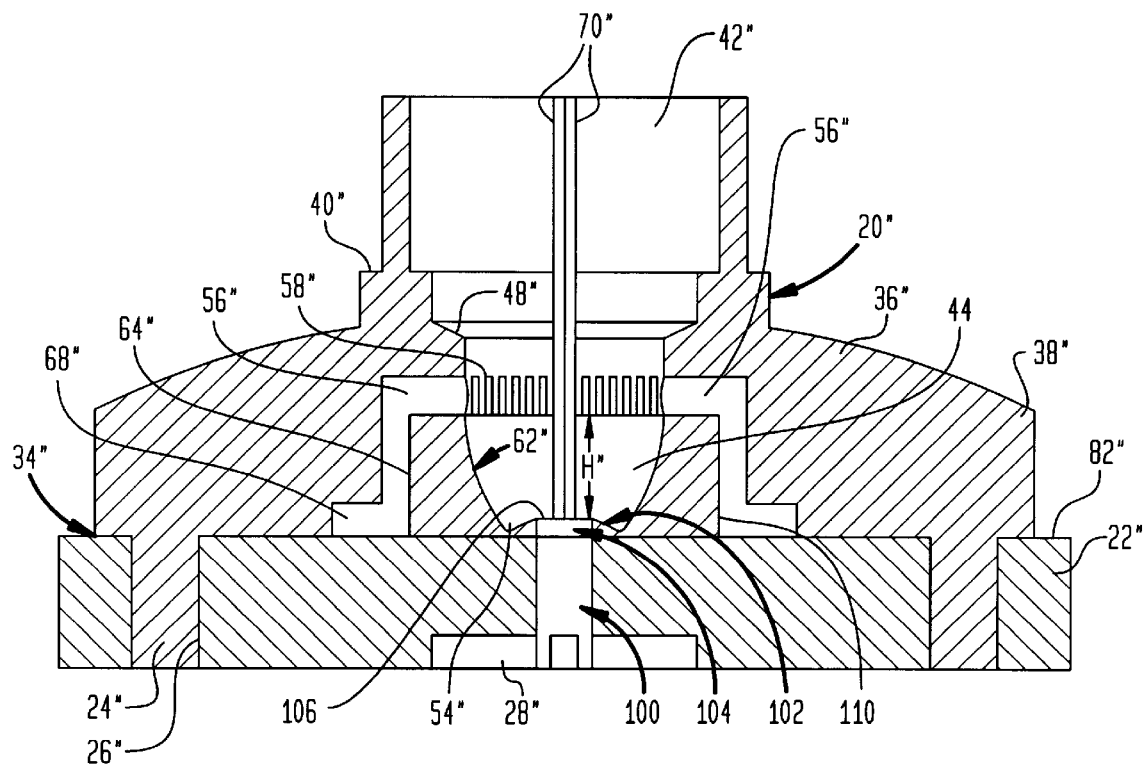
FIG. 5 is a cross-sectional view as in FIG. 3, but showing another alternative embodiment.

Referring to FIGS. 4 and 5, alternative embodiments of the volume-control receptacle 20 are shown. As with the embodiment discussed above, the receptacle is adapted to be used with a disposable cuvette 22. However, in the embodiment disclosed in FIG. 4, the reservoir is disposed entirely within the surface of the cuvette, and in the embodiment disclosed in FIG. 5, the entire reservoir, including the common supply area of FIG. 2, is disposed entirely within the receptacle portion of the invention. Again, as with FIG. 2, the solid portions of the cuvette are shown shaded with vertical lines, and the solid portions of the receptacle are shown shaded with horizontal lines.

More particularly, referring to FIG. 4, the disposable cuvette 22' has a plurality of conduits 28' (only two shown), each having a drive aperture (not shown). In contrast to the previous embodiment, the cuvette 22' has a circular ring 78 with a cylindrical outer wall 80 and that extends upward from the top planar surface 82 of the cuvette 22.' This ring 78 and outer wall 80 define the reservoir 44.' The reservoir 44' has a bottom 54' that is concave and has a transport conduit 83 that extends from the bottom 54' of the reservoir to the plurality of the conduits 28.' The transport conduit 83 is analogous to the lower section 52 of the common supply area of the first embodiment.

The volume control apparatus 20' has an annular ring 84 with an annular outer wall portion 86, an annular top portion 88, an inner annular wall portion 90, and a foundation 34.' The annular ring 84 defines a center opening 96. When the volume control apparatus is placed on the cuvette 22,' the annular inner wall 90 snugly engages the outer wall 80 of the circular ring 78 of the cuvette 22.' The annular ring 84 is of such a height that the annular top portion 88 engages the top of the circular ring 78, and the foundation 34' engages the upper planar surface 82 of the cuvette 22.' The annular ring 84 has a plurality of capillaries 56' cut into the annular wall portion 86 adjacent the inner wall 90, so that the inner wall 90 of the annular ring 84 defines one of the side walls for each of the capillaries. At one end, the capillaries open into and are in communication with the center opening 96 above the fill level of the reservoir 44; at the other end, the capillaries are in communication with an annular bore 92 in the foundation which forms a common terminus for the capillaries.

The annular top portion 88 has a ramped surface 94 which slopes towards the center opening 96. In operation, the user secures the volume control apparatus to the disposable cuvette 22,' and installs the cuvette 22' in the testing instrument (not shown). In a preferred embodiment, the volume control apparatus 20' is prepackaged with the cuvette 22,' although they also may be packaged separately. The user places a pipette tip or needle (not shown), generally in the center opening 96 and preferably down near the bottom wall 54' of the reservoir 44 to fill the reservoir from the bottom up and reduce the chance of a bubble forming. If the user places the needle down into in the reservoir 44 near its bottom 54, the needle should be moved upward as fluid is delivered to the reservoir.

The user can quickly place slightly more fluid into the reservoir than is required for the test with the assurance that the volume control apparatus 20 will remove the excess fluid. Once the reservoir is filled with the proper amount of fluid, any excess is drawn away from the reservoir 44' by the capillaries 56.'

Referring now to FIG. 5, another alternative embodiment of a volume-control receptacle 20" for use with a disposable cuvette 22" is shown. As with the previously described embodiments, the volume-control receptacle 20" has a base 36" with a plurality of arms 38." The volume-control receptacle 20" is adapted to be carried on a disposable cuvette 22." The receptacle 20" has a plurality of legs 24" depending from a foundation 34." The cuvette 22" has a plurality of holes 26" for receiving the legs 24" of the receptacle 20." The cuvette 22" also a plurality of conduits 28" (only two are shown), each having a drive aperture (not shown).

However, in contrast to the previous embodiments, the cuvette 22" does not have a common supply area of its own. The plurality of conduits 28" join together into a single transport conduit 100 that extends to the top planar surface 82" of the cuvette 22." The transport conduit 100 has a diameter similar to that of the lower section 52 of the common supply area 30 seen in FIG. 3.

The volume-control receptacle 20" has a reservoir 44" located centrally in the base 36." The reservoir 44" has a bottom 54" with a convex surface 102. The volume-control receptacle 20" has a conduit 104 which extends from an apex 106 of the bottom 54" to the foundation 34" of the receptacle 20" for communication with the transport conduit 100 of the cuvette 22."

Figure 6:
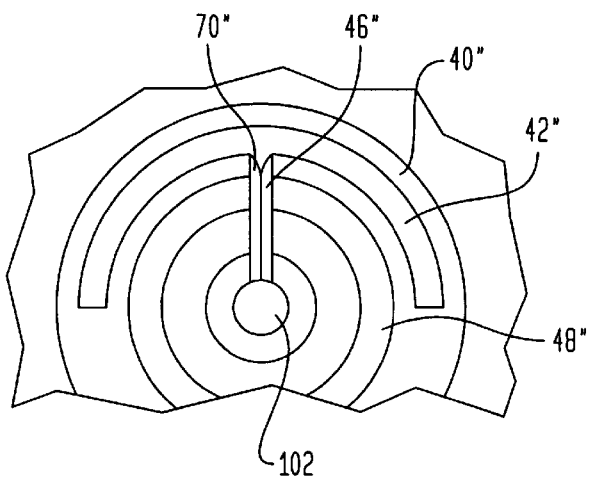
FIG. 6 is a top view of the lip and rib of the embodiment of FIG. 5.

Looking at FIGS. 5 and 6, a promontory 40" projects upward from the base 36." A director lip 42" extends from a portion of the promontory 40." The promontory 40" encircles the top of the reservoir 44," and the lip 42" projects upward from the promontory 40." A ramped surface 48" extends downward from the lip 42" or the promontory 40" into the reservoir. Preferrably, the lip 42" is semi-circular.

The volume-control receptacle 20" has a plurality of capillaries 56" that are located radially around the reservoir 44." Each of the capillaries 56" has an opening 58" which originates at the reservoir 44" at a specific height "h"" above the bottom, thereby defining a specific volume in the reservoir. In a preferred embodiment, the volume-control receptacle 20" has a cylindrical disk 110 which forms the bottom 54" and sidewall 62" for the reservoir 44" and one of the walls 64" for the capillaries 56."

Each one of the capillaries 56" extends from the opening 58" at the reservoir to the foundation 34" of the volume-control receptacle 20." An annular ring 68" is cut in the volume-control receptacle 20" at the foundation and is in communication with the capillaries.

Looking at FIG. 6, the volume-control receptacle 20" has a rib 46"; the rib 46" extends down from the top of the lip 42," across the ramped surface 48," and down to the bottom 54" of the reservoir 44." The rib 46" defines a corner 70" against which a pipette tip or needle (as shown in phantom in FIG. 3) can be placed. The needle contains a fluid to be tested. The fluid 74" flows down the corner 70" into the reservoir 44."

This embodiment of the volume-control receptacle operates as with the other embodiments. The user places the receptacle 20" on the disposable cuvette 22" and installs the cuvette 22" in the testing instrument (not shown). The user places a pipette tip or needle with fluid next to the rib 46." The user can quickly place slightly more fluid down into the receptacle than is required with the assurance that the volume-control receptacle 20" will remove the excess fluid. The fluid will move down the rib 46" and fill the reservoir 44" from the bottom up, thus filling the reservoir free of entrapped air bubbles. The convex bottom also minimizes the likelihood of a bubble forming. When the fluid reaches the top of the reservoir, the excess fluid will be drawn away from the reservoir by the capillaries 56." The total volume of the plurality of the capillaries is capable of retaining excess fluid in most situations.

When the excess fluid has been drawn away, the testing instrument can draw the fluid from the reservoir 44" into the conduits 28" by unblocking the drive apertures and creating a suction on the drive apertures. Because of the convex shape of the bottom 54," a portion of the fluid 74" remains in the bottom of the reservoir 44." That portion of fluid remaining would be taken into account when determining the height of the capillaries 44" (and thereby the volume of the reservoir).

Bottle-Cap Alternative Embodiment

Figure 7:
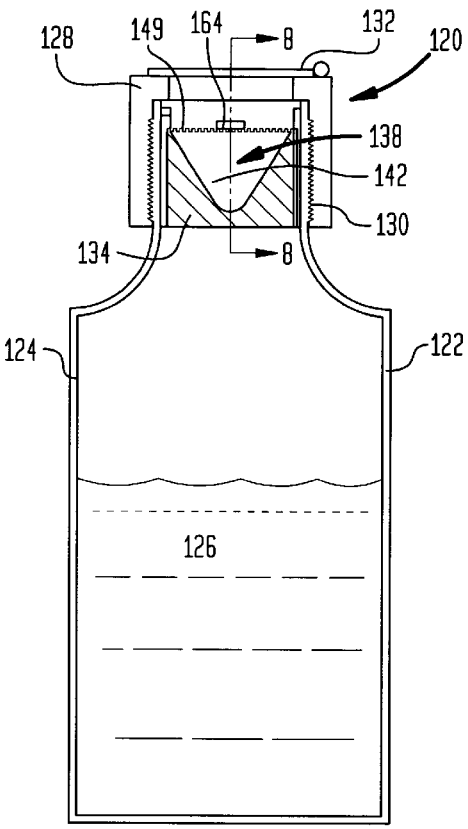
FIG. 7 is a front cross-sectional view of an alternative embodiment of the volume controlled receptacle configured to be used with a bottle.
Figure 8:
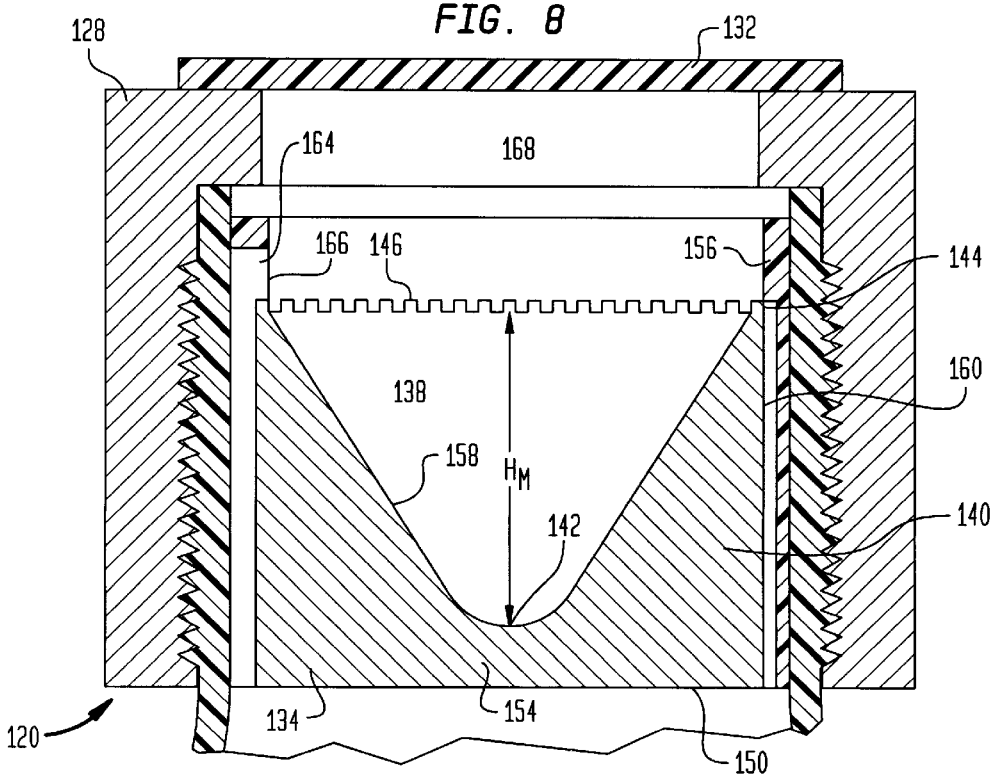
FIG. 8 is a cross-sectional view of the volume-control receptacle taken along the line 8—8 of FIG. 7.

Referring to FIGS. 7 and 8, an alternative embodiment of a volume-control receptacle or cap 120 for a bottle 122 is shown. The bottle 122 comprises a container 124 for holding fluid 126 and a cap 128. The container 124 has a threaded neck 130 for securing the cap 128 which has a flip-open lid 132, although other types of lids that can be moved from an open to a closed position are contemplated. In a preferred embodiment, the volume-control receptacle 120 is an insert 134 that snugly fits within the inside of the neck 130 of the container 124. It is recognized that the volume-control receptacle 120 can be a part of the cap 128.

The volume-control receptacle 120 has a reservoir 138 located centrally in a base 140 of the insert 134. The reservoir 138 has a concave bottom 142. The volume-control receptacle 120 has a plurality of capillaries 144 located radially around the reservoir 138. Each of the capillaries 138 has an opening 146 which originates at the reservoir 138 at a specific height "$h_m$" above the bottom 142, thereby defining a specific volume in the reservoir 138. Each of the capillaries 138 extends from the opening 146 at the reservoir 138 to the foundation 150 or the bottom of the insert 134.

In a preferred embodiment, the volume-control receptacle 120 has a cylindrical disk 154 and an annular ring portion 156. The cylindrical disk 154 forms the bottom 142 and the wall 158 of the reservoir 138 and one of the walls 160 for the capillaries 144. The annular ring portion 156 has a series of indentations formed on an inner wall 162 to create the capillaries 144.

In addition, the volume-control receptacle 120 has a fill tube 164. The fill tube 164 extends from the foundation 150 to an opening 166 located above the height of the capillaries 144, when the bottle 122 and the volume-control receptacle 120 are in the upright position.

In operation, the user first fills the bottle 122 with the medicine or fluid 126 to be administered or tested. The user places the cap on the bottle with the flip-open lid 132 in the closed position. The user then turns the bottle 122 upside down, such that the cap 128 is located below the container 124. By force of gravity, the fluid 126 will flow through the fill tube 164 and fill an open area 168 located between the flip-open lid 132 and the reservoir 138. The capillaries 144 allow air to escape from the open area 168.

The person then flips the bottle 122 back over in an upright position, thereby allowing the fluid 126 to settle in the reservoir 138. The excess fluid 126 will be drawn away by the capillaries 144. The flip-open lid 132 is then opened and the proper amount of fluid 126 is found in the reservoir 138. The fluid 132 can be removed from the reservoir 138 by using a straw, a dropper, or another method.

The present invention may be embodied in other specific forms without departing from the spirit or essential attributes therefor. Accordingly, references should be made to appended claims, rather than to the foregoing specification, as indicating the scope of the invention.

We claim:

1. A volume-control receptacle for receiving a specific volume of fluid comprising:
   a receptacle base having an upper inlet and a cup-like bore in communication with the upper inlet, the cup-like bore defining a reservoir with a bottom; and
   a plurality of capillaries connected to the cup-like bore and opening at a specific height above the bottom of the reservoir for draining excess fluid from the receptacle to achieve a specific volume of fluid in the reservoir, the volume of fluid being determined by the height of the plurality of capillaries relative to the bottom of the reservoir.

2. The volume-control receptacle as in claim 1 wherein the plurality of capillaries are disposed within the receptacle base.

3. The volume-control receptacle as in claim 1 wherein the reservoir has a convex bottom.

4. The volume-control receptacle as in claim 1 wherein the reservoir has a concave bottom.

5. The volume-control receptacle as in claim 1 further comprising a rib extending from the bottom of the reservoir to above the plurality of capillaries for guiding the fluid from the upper inlet of the receptacle to the bottom of the reservoir.

6. The volume-control receptacle as in claim 1 wherein the reservoir has a drain hole for allowing the fluid to drain from the reservoir once the specific volume of fluid has been received therein.

7. The volume-control receptacle as in claim 1 further comprising a promontory extending upward from the upper inlet of the receptacle and bordering at least a portion of the upper inlet of the receptacle.

8. The volume-control receptacle as in claim 7 further comprising a lip extending upward from the promontory.

9. The volume-control receptacle as in claim 8 further comprising a rib extending from the bottom of the reservoir to the top of the lip for guiding the fluid to the bottom of the reservoir so that the reservoir can be filled from the bottom-up to minimize the entrapment of air bubbles in the reservoir.

10. The volume-control receptacle as in claim 1 further comprising a fill tube extending from the bottom of the receptacle base to a pre-determined point above the plurality of capillaries for filling the reservoir.

11. A volume-control receptacle as in claim 10 further comprising a lid, wherein the lid is adapted to be mounted on the receptacle base and to be moved between a closed position and an open position; and wherein when the lid is in a closed position, it covers the reservoir, and wherein when the lid is in the open position, it grants access to the reservoir whereby the specific volume of fluid can be removed.

12. A volume-control apparatus for receiving a specific volume of fluid and delivering the fluid to a final application point, the apparatus comprising a volume-control receptacle adapted to be secured on top of a cuvette, wherein the cuvette has an inlet port and at least one outlet port, and wherein the cuvette contains at least one conduit extending from the inlet port to the at least one outlet port;

wherein the volume-control receptacle comprises a base having an upper inlet and at least one opening disposed at a point below and in communication with the upper inlet for draining excess fluid from the receptacle;

wherein the volume-control receptacle or the cuvette further contains a cup-like bore defining a reservoir having a bottom so that when the receptacle is placed on top of the cuvette, the reservoir is disposed between the at least one opening of the receptacle and the inlet port of the cuvette, and so that when the receptacle is placed on top of the cuvette, the at least one opening is disposed at a pre-determined point above the bottom of the reservoir for draining excess fluid from the receptacle to achieve a specific volume of fluid in the reservoir, the volume of fluid being determined by the height of the at least one opening relative to the bottom of the reservoir; and wherein the bottom of the reservoir further contains a drain hole in communication with the inlet port of the cuvette for allowing the fluid to drain from the reservoir to the at least one conduit of the cuvette and to the outlet port of the cuvette once the specific volume of fluid has been received in the reservoir.

13. The volume-control apparatus as in claim 12 wherein the cup-like bore defining the reservoir is disposed entirely within the receptacle base.

14. The volume-control apparatus as in claim 12 wherein the at least one opening comprises a plurality of capillaries opening at a specific height above the bottom of the reservoir for draining excess fluid from the receptacle.

15. The volume-control apparatus as in claim 12 wherein the bore defining the reservoir is disposed in the receptacle base, and wherein the inlet port of the cuvette comprises a common supply area that defines the bottom of the reservoir when the receptacle is placed on top of the cuvette.

16. The volume-control apparatus as in claim 12 wherein the cup-like bore defining the reservoir is disposed entirely within the cuvette.

17. A volume-control apparatus as in claim 14 further comprising a promontory extending around the upper inlet of the receptacle;

a lip extending upward from the promontory; and a rib extending from the lip to the bottom of the reservoir for guiding the fluid to the bottom of the reservoir free of entrapped air bubbles.

18. A volume-control receptacle as in claim 12 wherein the reservoir has a convex bottom.

19. A volume-control receptacle adapted for use with a bottle having a container and a cap, the volume-control receptacle comprising an insert disposed within the cap, the insert having an upper inlet opening;

a cup-like bore in communication with the upper inlet opening, the cup-like bore defining a reservoir with a bottom;

a plurality of capillaries opening onto the reservoir at a specific height above the bottom of the reservoir for drawing away excess fluid from the reservoir; and a fill tube for delivery of the fluid from the container of the bottle to the reservoir when the bottle is inverted; and wherein the receptacle further comprises a lid adapted to be mounted on the cap and to be moved between a closed position and an open position; and wherein when the lid is in a closed position, it covers the reservoir, and wherein when the lid is in the open position, it grants access to the reservoir.

20. The volume-control apparatus as in claim 19 wherein the lid is a flip-open lid pivotally mounted on top of the bottle cap.

21. A method of filling a cuvette with a specific volume of fluid comprising the steps of:

providing a cuvette having a common supply area, at least one drive aperture, and a plurality of conduits, each of the plurality of conduits extending from the common supply area to the at least one drive aperture;

placing a volume-control receptacle on the cuvette, wherein the volume-control receptacle has a base with an upper inlet and a plurality of capillaries disposed below the upper inlet for drawing away excess fluid;

placing the cuvette with the volume-control receptacle into a testing instrument, therein blocking the drive apertures and leaving the receptacle accessible;

filling a reservoir disposed within the volume-control receptacle or the cuvette by placing fluid into the reservoir through the upper inlet of the volume-control receptacle; and drawing away any excess fluid through the plurality of capillaries in the volume-control receptacle wherein the capillaries each have an opening at a specific height above the bottom of the reservoir.

22. A method of filling a cuvette with a specific volume of fluid as in claim 21, further comprising the following step:

drawing the fluid into the plurality of conduits by unblocking the drive apertures after the capillaries of the volume-control receptacle have drawn away the excess fluid.

23. A method of filling a cuvette with a specific volume of fluid as in claim 21, further comprising the following step:

filling the reservoir from the bottom up so that the reservoir is filled free of entrapped air bubbles by providing a rib extending from the bottom of the reservoir to the top of the upper inlet of the receptacle for guiding the fluid to the bottom of the reservoir.

* * * * *